April 6, 1954 W. CRAFTS 2,674,529
MANUFACTURE OF LOW-CARBON STAINLESS STEEL
Filed Feb. 20, 1952
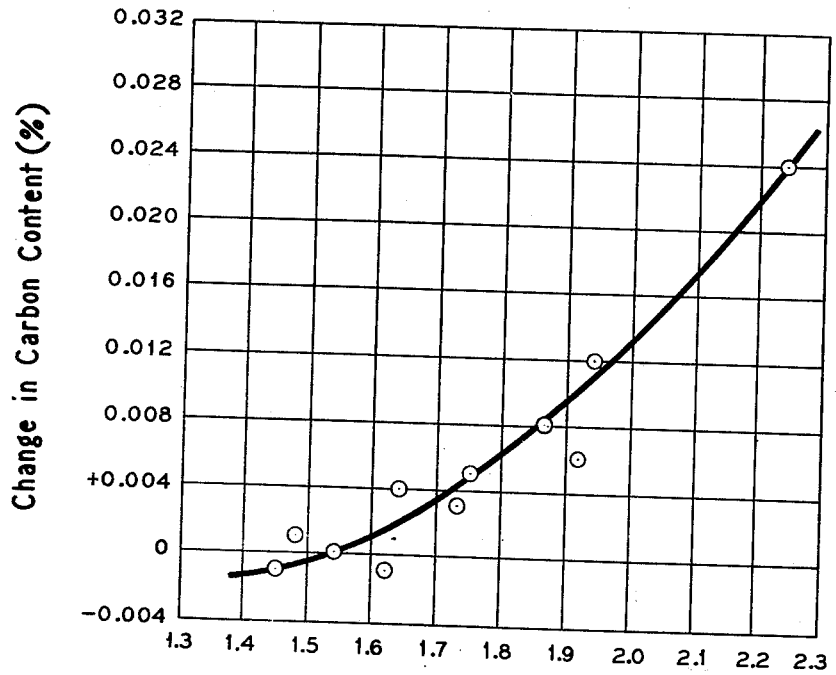
INVENTOR
WALTER CRAFTS
BY D.C.Harrison
ATTORNEY Patented Apr. 6, 1954

2,674,529

UNITED STATES PATENT OFFICE 2,674,529

MANUFACTURE OF LOW-CARBON STAINLESS STEEL

Walter Crafts, Niagara Falls, N. Y., assignor to Union Carbide and Carbon Corporation, a corporation of New York Application February 20, 1952, Serial No. 272,613

4 Claims. (Cl. 75—12)

This invention relates to a process for finishing low-carbon stainless steels of both ferritic and austenitic types.

Stainless steels having a carbon content of not more than 0.03% have a high resistance to corrosion and improved mechanical properties. The development of the use of oxygen in decarburizing a steel bath and the availability of very low carbon ferrochromium has made practicable the manufacture of these steels on a commercial scale. They are being widely used in industry to solve corrosion problems.

The usual procedure in making such steels is to charge an electric arc furnace having carbonaceous electrodes with carbon steel scrap and chromium-bearing material, such as stainless steel scrap. The charge is melted and decarburized with oxygen until the metal has a carbon content of about 0.015%. The resulting slag contains a high proportion of metallic oxides. These oxides are reduced and the metallic constituents recovered by adding a silicon or aluminum bearing reagent, or, alternatively, the oxidizing slag is discarded and a new finishing slag formed. The steel is deoxidized, suitably at the time of the reduction of the slag, by the addition to the steel of suitable deoxidation agents. If necessary, the composition of the steel is adjusted, either simultaneously with or following the reduction of the slag and deoxidation of the metal, with low carbon alloying materials, such as ferrochromium and ferrochrome-silicon.

The furnace lining in the process described above can be acidic, neutral, or basic, but because of certain advantages of the basic furnace, such as increased chromium recovery, the use of a basic slag and a basic furnace lining is desirable.

One of the most troublesome problems encountered in the manufacture of low carbon steels in a basic lined furnace under a basic slag is that of carbon pickup or carbon creep in the finishing operation. The ferrochromium alloys usually employed have so low a carbon content that their addition to the molten steel would be expected to bring about the reduction of the percentage of carbon in the steel. Nevertheless, in practice it has been found under basic furnace conditions that an increase in the carbon content of the steel occurs when the low carbon ferrochromium is added, and a gradual increase in the carbon content continues during the time required to finish the refining period of the heat.

Since the carbon content of the steel is about 0.015% before the ferrochromium is added, the carbon pickup must be very small to avoid exceeding 0.03% maximum carbon in the finished steel.

The principal object of the invention is to provide a process for finishing low carbon stainless steels manufactured in a basic lined furnace whereby the increase in the carbon content of the steel during and after the addition of chromium to the steel is retarded.

The object of the invention is accomplished by melting the scrap; decarburizing the molten steel in the conventional way in a basic lined electric arc furnace; and then for the finishing operation, providing the furnace with a slag having a base-acid ratio of 1.5 or less. If chromium is to be added to the steel during the finishing operation, the slag having a base-acid ratio of 1.5 or less is provided at the time of or shortly after the addition of the chromium containing material.

The term "base-acid ratio" used in describing a slag means the ratio of the base forming constituents to the acid forming constituents in the slag. Lime and magnesia are the principal base forming constituents and silica is the principal acid forming constituent. The ratio can be expressed in this manner $$\frac{CaO + MgO}{SiO_2}$$

Conventionally, a basic slag is one having a base-acid ratio of about 2.0 or higher while an acidic slag has a ratio of less than about 1.0. Alumina is presumed to be neutral with respect to basicity.

The slag having a base-acid ratio of 1.5 or less as required in the finishing process of the invention can be obtained in any of several ways. The oxidizing slag can be removed and a new slag having the proper composition substituted therefor. Preferably, the composition of the slag is adjusted to a base-acid ratio of 1.5 or less by adding an acid forming constituent to the slag, for example, by the addition of silica or either ferrosilicon or other silicon containing alloys which form silica as a result of reduction of the metallic constituents of the slag.

Carbonaceous electrodes such as are conventionally employed in an electric arc furnace are consumed during the operation of the furnace. Some carbon is thereby made available for contamination of the steel. In an investigation of the cause of the carbon pickup in a basic furnace, it was observed that spoon test samples of the bath soon after a ferrochromium addition not only contained higher chromium than the average of the bath because of incomplete diffusion, but also contained higher than average carbon. For example, in one heat the carbon content after the oxygen blow was 0.020% and the spoon sample taken soon after the ferrochromium addition (0.012% carbon) contained 0.030% carbon and 22.01% chromium, whereas, if dilution of the bath were the only factor involved, a decrease of carbon should have been found. That there was actually a local enrichment of carbon is indicated by the fact that the final composition was 0.020% carbon and 18.90% chromium. In another heat of 25% chromium steel, the carbon was lowered to 0.020% with oxygen, and after the addition of ferrochromium containing 0.016% carbon, the spoon test gave 0.040% carbon and 35.03% chromium. By the time the heat was tapped, the diffusion of chromium was completed, and the final analysis was 0.028% carbon and 26.35% chromium. The data obtained in these tests indicate an accelerated transfer of carbon contained in the slag during the addition of the ferrochromium rather than a gradual increase which would be expected if there were a direct introduction of carbon from the electrode.

The effect of the slag composition on the carbon in slag was determined by melting synthetic lime-silica (5% alumina) slags in a graphite crucible and holding the slags at a temperature of 1600° C. for thirty minutes. The data from these tests, set forth in Table I, indicated that the carbon taken up by the slags increased with the lime content or basicity of the slags.

Table I

| Lime/Silica Ratio | 1/2 | 1/1 | 2/1 |
|---|---|---|---|
| Carbon in Slag (percent) | 0.012 | 0.014 | 0.039 |

A series of tests was run in a one ton basic arc furnace. In these tests additions of chromium were made to decarburized steel either simultaneously with or after deoxidation. The chromium was in the form of ferrochromium (maximum 0.03% carbon) or silicon bearing ferrochromium (maximum 0.02% carbon). In some instances the single slag and in others the double slag practice was used. The amount of carbon picked up during the finishing and deoxidizing steps was determined by comparing the carbon content in the steel after decarburization with the carbon content in the final steel.

In the drawing, the results of the tests in the one ton basic arc furnace are set forth in the form of a graph.

As shown in the drawing, the carbon pickup declined as the basicity or base-acid ratio

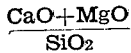

$$\frac{CaO + MgO}{SiO_2}$$

of the slag decreased. The low solubility of the carbon in the less basic slags retarded the transfer of carbon from the slag to the steel. When the basicity was 1.5 or less, the carbon pickup during the time required to dissolve the chromium alloy and finish the heats was negligible.

It is also evident from the drawing that the amount of carbon that is picked up from slags with a basicity ratio in excess of 2, heretofore used in basic lined furnaces, is enough to make it very difficult to finish the steel with a carbon content below 0.03%. By virtue of a slag with a low basicity ratio the pick-up of carbon is minimized to such a degree that successful manufacture of 0.03% maximum carbon stainless steel in the basic lined furnace is made practical.

I claim:

1. The process of manufacturing stainless steel having a maximum carbon content of 0.03% which comprises preparing a molten bath of steel in an arc furnace having a basic lining, adjusting the carbon content of said steel to a maximum of 0.03%, and finishing said steel under a slag having a base-acid ratio of not more than 1.5.

2. In the process of manufacturing stainless steel having a maximum carbon content of 0.03% which comprises preparing a molten bath of steel in an arc furnace having a basic lining, adjusting the carbon content of said steel to a maximum of 0.03%, and finishing said steel by adding alloying elements thereto, the improvement in the finishing of said steel which comprises dissolving a chromium containing material in said steel under a slag having a base-acid ratio of not more than 1.5.

3. In the process of manufacturing stainless steel having a maximum carbon content of 0.03% which comprises preparing a molten bath of steel in an arc furnace having a basic lining, adjusting the carbon content of said steel to a maximum of 0.03%, and finishing said steel by adding alloying elements thereto, the improvement in the finishing of said steel which comprises dissolving low carbon ferrochromium in said steel under a slag having a base-acid ratio of not more than 1.5.

4. In the process of manufacturing stainless steel having a maximum carbon content of 0.03% which comprises preparing a molten bath of steel under a basic slag in a furnace having a basic lining, adjusting the carbon content of said steel to a maximum of 0.03%, and finishing said steel by adding alloying elements thereto, the improvement in the finishing of said steel which comprises adding a silicon containing material to the slag in quantities sufficient to make the base-acid ratio of the slag not more than 1.5 and dissolving chromium containing material in the molten steel under the slag having a base-acid ratio of not more than 1.5.

References Cited in the file of this patent

UNITED STATES PATENTS

| Number | Name | Date |
|---|---|---|
| 2,458,651 | Schulz | Jan. 11, 1949 |